United States Patent
Ieda et al.

(10) Patent No.: US 7,598,915 B2
(45) Date of Patent: Oct. 6, 2009

(54) BOBBIN FOR BAR ANTENNA, ANTENNA AND DOOR HANDLE FOR A VEHICLE

(75) Inventors: Kiyokazu Ieda, Kariya (JP); Eiji Mushiake, Chita-gun (JP); Sumitaka Sato, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 101 days.

(21) Appl. No.: 11/902,021

(22) Filed: Sep. 18, 2007

(65) Prior Publication Data
US 2008/0068129 A1     Mar. 20, 2008

(30) Foreign Application Priority Data
Sep. 20, 2006    (JP) ............................. 2006-254524

(51) Int. Cl.
*H01Q 1/32* (2006.01)
*H01Q 1/00* (2006.01)
*H01Q 1/36* (2006.01)

(52) U.S. Cl. ..................... 343/713; 343/787; 343/895

(58) Field of Classification Search ................ 343/711, 343/713, 787, 895, 893
See application file for complete search history.

(56) References Cited

U.S. PATENT DOCUMENTS

| | | | |
|---|---|---|---|
| 6,400,330 B1 | 6/2002 | Maruyama et al. | |
| 6,980,171 B2 * | 12/2005 | Maruyama et al. | 343/788 |
| 7,095,381 B2 * | 8/2006 | Kimura et al. | 343/788 |
| 7,180,281 B2 | 2/2007 | Inuzuka et al. | |
| 7,307,593 B2 * | 12/2007 | Ieda et al. | 343/713 |
| 2006/0164311 A1 | 7/2006 | Ieda et al. | |
| 2007/0096905 A1 | 5/2007 | Ieda et al. | |

FOREIGN PATENT DOCUMENTS

| | | |
|---|---|---|
| JP | 2001-358522 A | 12/2001 |
| JP | 2004-176343 A | 6/2004 |

* cited by examiner

*Primary Examiner*—Shih-Chao Chen
(74) *Attorney, Agent, or Firm*—Buchanan Ingersoll & Rooney PC

(57) ABSTRACT

The bobbin for the bar antenna includes a core supporting portion into which a bar shaped ferromagnetic core is inserted and supported. The core supporting portion is attached to at least one end of the bar antenna formed by the core around which a conductive wire material is wound. The bobbin further includes a conductive wire material fixing portion for fixing the conductive wire material and a core holding portion for sandwiching the core inserted into the core supporting portion from both sides opposing to each other and firmly pressing by a tension force of the conductive wire material wound thereon.

15 Claims, 6 Drawing Sheets

BOBBIN FOR BAR ANTENNA, ANTENNA AND DOOR HANDLE FOR A VEHICLE

CROSS REFERENCE TO RELATED APPLICATIONS

This application is based on and claims priority under 35 U.S.C. § 119 to Japanese Patent Application 2006-254524, filed on Sep. 20, 2006, the entire content of which is incorporated herein by reference.

FIELD OF THE INVENTION

The present invention relates to a bobbin for a bar antenna, and more particularly to a bobbin attached to at least one end of a bar antenna formed by winding a conductive wire member around a bar shaped ferromagnetic core and a bar antenna using the bobbin. This invention further relates to a door handle for a vehicle using the bar antenna.

BACKGROUND

A smart entry system has been recently applied to a vehicle door lock system. This smart entry system detects the behavior of the user of the vehicle, such as approaching to the vehicle for opening the door or getting off the vehicle and executes automatic door locking or unlocking operation in response to such detected user's behavior. In more detail, the smart entry system detects the user's door locking and unlocking operation based on the user's operation of a door handle provided on the door of the vehicle. For example, according to this system, the door lock is released when the user outside the vehicle approaches his or her vehicle and touches the door handle with a hand for opening operation.

The behavior of the user of the vehicle, such as approaching to the vehicle or getting off the vehicle can be recognized by a communication between a hand carried device (such as a remote control), which a user of a vehicle carries with him or her, and a vehicle inside device. The radio wave communication is usually made through a bar antenna provided on the door handle of the vehicle. One of such bar antenna devices is disclosed in a Japanese Patent 2001-358522 A (in columns 12 through 39 and FIG. 1 or 2) or another Japanese Patent 2004-176343 A (in columns 44 through 46 and FIG. 1). According to the first publication (Japanese Patent 2001-358522 A), the disclosed bar antenna includes a ferromagnetic core portion and a bobbin enclosing the core portion and carrying a coil thereon. Both core and the bobbin are housed in a housing case and sealed within the housing case by a potting agent or the like. Accordingly, the anti-water (water resistance) performance is very high due to the sealed structure. However, solidification has to be made after filling the potting agent in the housing case. This will increase a manufacturing process, which eventually increases the manufacturing cost. According to the second publication (Japanese Patent 2004-176343 A), the bar antenna includes a rectangular solid ferrite and a vehicle use wire harness wound directly around the ferrite. This antenna structure is very simple in use structure by only a ferrite and a covering wire harness. This antenna structure also is superior in anti-water performance. This is because the structure has no connecting portions, just extending the wire harness for connection purpose. However, the structure may be unstable in antenna performance unless the ferrite and the wire harness are securely fixed. In order to securely fix the two members, a heat forming process is used to fix the harness on the ferrite core by plasticity deforming the wire harness by applying heat. This can stabilize the wire harness to the ferrite, but it needs extra processing, such as a heat processing, which eventually increases the manufacturing cost.

It is therefore, an object of the present invention to provide a bobbin for a bar antenna which can be assembled in simple way with less number of manufacturing process.

It is another object of the invention to provide an improved bar antenna using the improved bobbin in simple way with less number of processing.

It is still further object of the invention to provide a door handle for a vehicle having a high durability using the improved bar antenna in simple way with less number of processing.

SUMMARY OF THE INVENTION

According to one aspect of the invention, the bobbin for the bar antenna includes a core supporting portion into which a bar shaped ferromagnetic core is inserted and supported. The core supporting portion is attached to at least one end of the bar antenna formed by the core around which a conductive wire material is wound. The bobbin further includes a conductive wire material fixing portion for fixing the conductive wire material and a core holding portion for sandwiching the core inserted into the core supporting portion from both sides opposing to each other and firmly pressing by a tension force of the conductive wire material wound thereon.

BRIEF DESCRIPTION OF THE DRAWINGS

The foregoing and additional features and characteristics of the present invention will become more apparent from the following detailed description considered with reference to the accompanying drawings, wherein.

DESCRIPTION OF PREFERRED EMBODIMENTS

Figure 1:
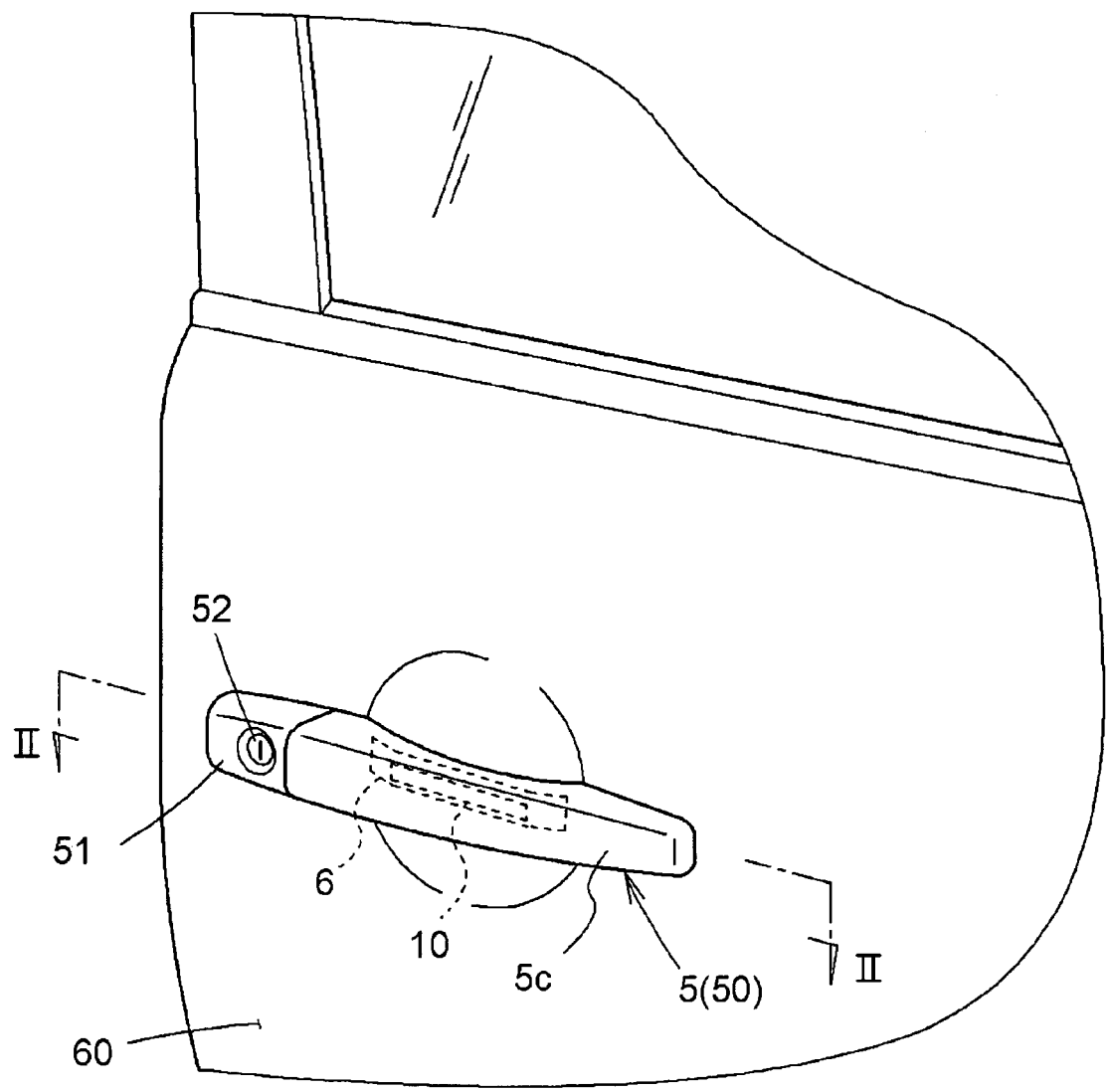
FIG. 1 is a perspective view of a vehicle with a door handle on a door of the vehicle according to an embodiment of the invention.
Figure 2:
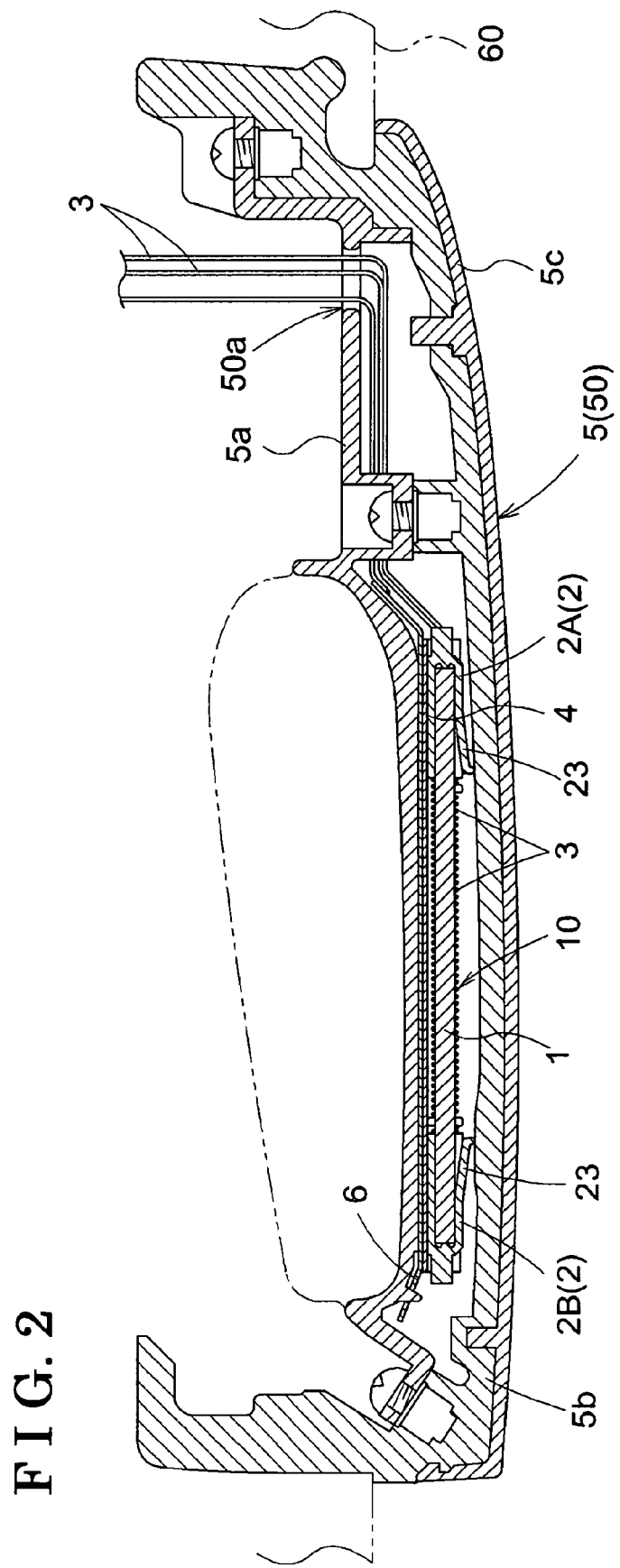
FIG. 2 shows a cross sectional view of the door handle taken along the line II-II in FIG. 1.

In the embodiment, the door handle and the bar antenna are adapted to be used in a smart entry system for the vehicle. The bar antenna is housed in the door handle of the smart entry system and the bobbin for a bar antenna (just simply called as "bobbin" instead of "bobbin for a bar antenna") is one of the components forming the bar antenna. FIG. 1 is a view showing the door of the vehicle and the door handle for opening or closing the door and FIG. 2 shows the door handle in cross section.

As shown in FIG. 1, a door panel 60 (outside door panel) is equipped with a door handle 50 for opening or closing the door and secured to the door by a door handle frame provided inside the door panel 60 (Frame is not shown in the drawings). The door handle 50 includes a handle body 5 and a handle cap 51. A key cylinder 52 is provided at the handle cap 51 for locking or unlocking a door lock mechanism (not shown) by inserting and rotating a key by manual operation of the user.

The door lock system (mechanism) according to this embodiment of the invention includes a control mechanism (not shown) for automatically controlling the door lock/unlock operation by recognizing approaching action of the user of the vehicle who carries a remote control carrying device. For example, when the user of the vehicle approaches the vehicle, such action is recognized at the vehicle side and further when the user touches the door handle 50 for operation such action is also recognized and the door lock is automatically released for opening of the door by the door handle operation.

This is also applied to the action for locking the door. For example, when the user gets off the vehicle with the remote control carrying device, the system recognizes that the user is out of the vehicle and further, when the user operates the door handle 50 or the door with the intention of closing and locking the door, such locking action (including an intention) is recognized and the door is locked.

The remote control carrying device includes a receiving system for receiving the radio waves from the vehicle and a transmitting system for transmitting the radio waves to the vehicle and a control system for processing the receiving signals and/or sending signals. Generally, the receiving system and transmitting system include antenna, tuner and data set circuit, whereas the control system includes a microcomputer.

In the vehicle, a system ECU (Electronic Control Unit) and a receiving antenna are arranged. The system ECU controls general operation of the door lock mechanism (system) and recognizes the approach of user who carries a device (remote control carrying device) to the vehicle by communicating therewith. The receiving antenna receives transmitting signal from the carrying device and is normally housed in a room mirror where the electric wave receiving condition is relatively good.

As shown in FIG. 1 or 2, the door handle 50 further includes a bar antenna 10 for transmitting a signal to the remote control carrying device located outside the vehicle and an electrode plate 6 for an electric capacitance sensor for detecting the user's operation of the door handle 50. The antenna wire arrangement (a coil wire 3 or conductive wire material, which will be later explained in detail) of the bar antenna and the sensor wire arrangement are guided from an inside opening 50a (see FIG. 2) of the door handle 50 into the door panel 60.

As shown in FIG. 2, the handle body 5 of the door handle 50 is formed by an inner case 5a, an outer case 5b and an exterior case 5c. The inner and outer cases 5a and 5b are connected to each other to provide an inner space therebetween. The bar antenna 10 and the electrode plate 6 for the sensor are housed in the inner space formed by the inner and outer cases 5a and 5b. The exterior case 5c is attached to the outer case 5b from outside to provide a decorative surface on the outer side of the handle 50.

The opposite side (inside) of the door handle 50 relative to the door panel side 60 is provided with the electrode 6 for the electric capacitance sensor. The electrode plate 6 is attached to the inner surface of the inner case 5a. When the user of the vehicle intends to open the door, he or she usually pulls the door handle by hand. The hand of the user is inserted between outside of the door handle 50 and the door panel 60. Then the electric capacitance between the electrode plate 6 and the door panel 60 is changed. This capacitance change is detected and such capacitance change is determined that a user of the vehicle operates the door handle 50.

The bar antenna 10 is provided in the handle body 5 opposite to the electrode plate 6. The bar antenna 10 transmits an electric signal to the remote control carrying device carried by the user positioned outside of the vehicle. Basically the bar antenna is provided in the inner space of the handle body 5 at the outside of the vehicle. A portion (elastic portion 23) of the bar antenna 10 is in elastic contact with the inner wall of the outer case 5b. The bar antenna 10 is fixed to the outer case 5b by the biasing force generated at the elastic portion of the antenna 10. At the same time, the elastic portion 23 of the bar antenna 10 also biases the electrode plate 6 towards the other sidewall of the inner case 5a to fix the electrode plate 6 in stable in the inner space of the handle body 5.

The detail structure of the bar antenna 10 will be explained with reference to the attached drawings FIGS. 3(A) through 6. FIG. 3(A) through FIG. 3(D) show the steps for assembling the bar antenna. The bar antenna is formed by winding a single coil wire 3 (conductive wire material) around a ferromagnetic core 1 with a rectangular bar shape in cross section. The winding is made by one continuous line. The bar antenna 10 also includes a bobbin 2A at one end of the core 1 and another bobbin 2B at the other end of the core 1. In this embodiment, the bobbin 2 is provided at both ends of the core, but may be provided at either one of the core ends.

Figure 3A:
FIG. 3(A) is an exploded view of bar antenna assembling process according to the invention.
Figure 3B:
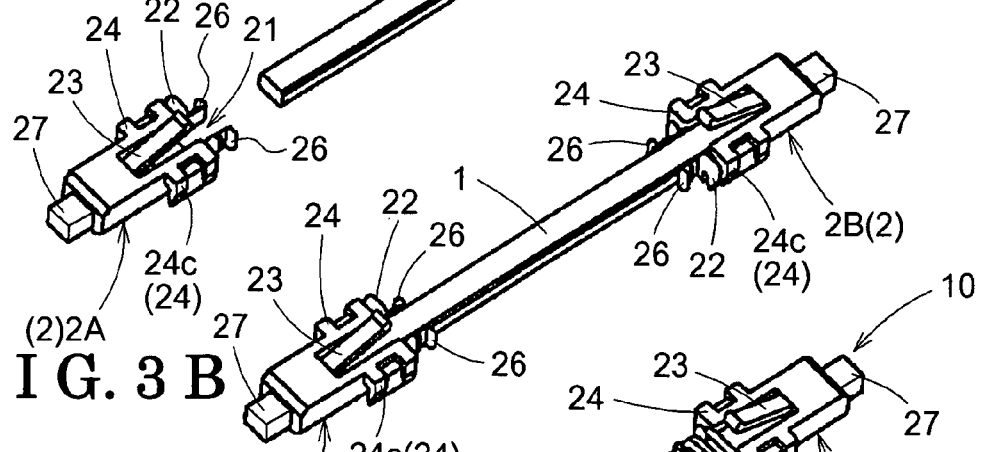
FIG. 3(B) is similar to FIG. 3(A), but showing the core 1 and the bobbin 2 being assembled.
Figure 5A:
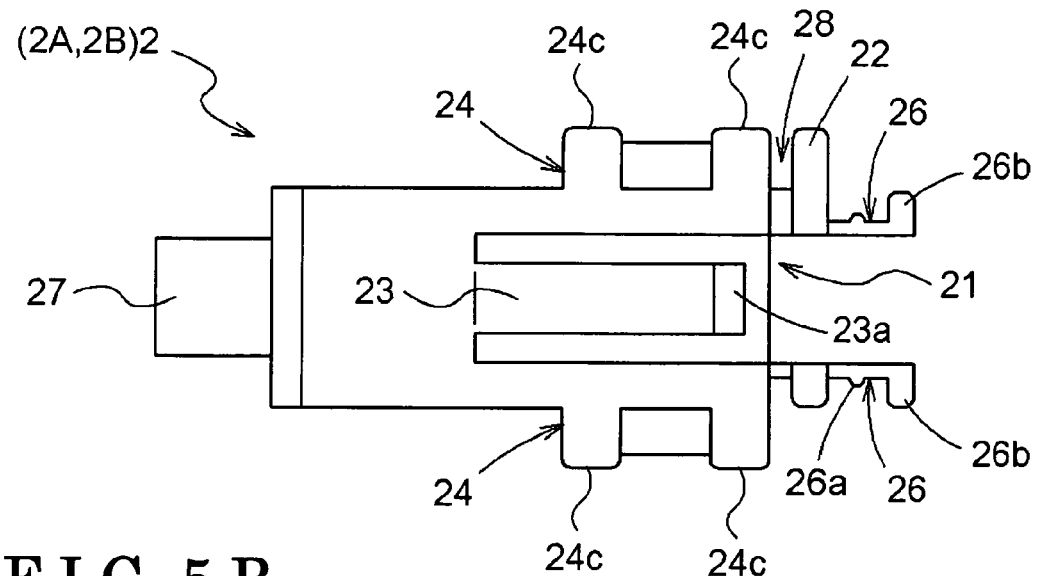
FIG. 5(A) is a top view of the bobbin for the bar antenna.
Figure 5B:
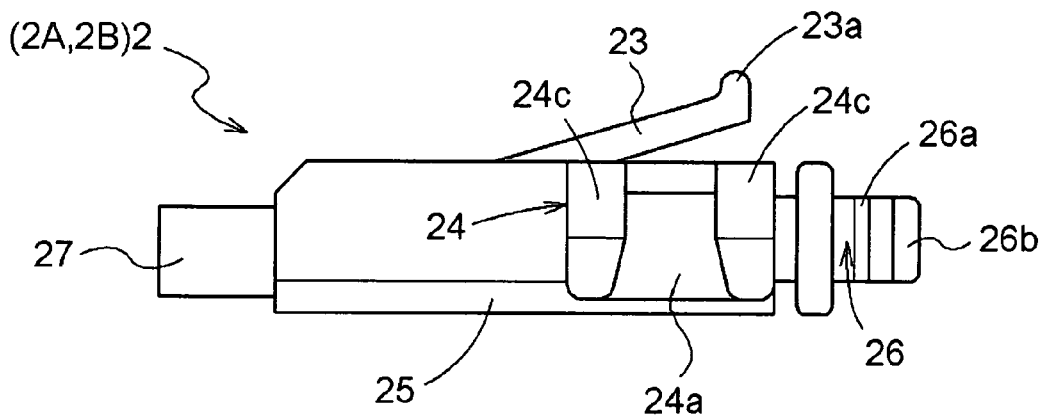
FIG. 5(B) is a side view of the bobbin for the bar antenna.
Figure 5C:
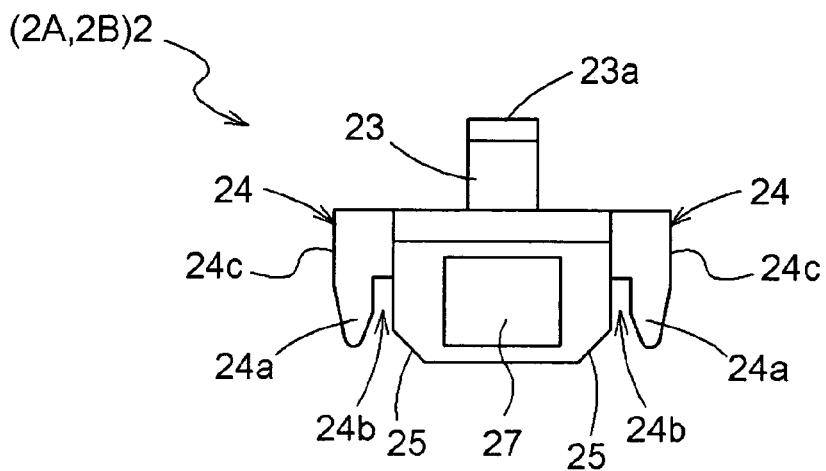
FIG. 5(C) is a front view of the bobbin for the bar antenna.

FIG. 5 (A) through FIG. 5(C) shows the bobbin 2 in three directions (top, side and front). The bobbin 2 (2A, 2B) includes a core supporting portion 21 for slidably supporting the core 1 by inserting the core therein as shown in FIG. 3(A) and FIG. 3(B).

The bobbin 2 further includes a sidewall 24 with a contact portion 24c. The contact portion 24c of the side wall 24 contacts with an intermediate case member 4 (see FIG. 3(D)) attached to the bar antenna 10. The position of the bar antenna 10 is defined by this intermediate case member 4 and is fixed thereto. The intermediate case member 4 may be the inner case 5a of the handle body 5 or the outer case 5b of the handle body 5. It is also possible to use a separate member as the intermediate case member such as for example the member 4 shown in FIG. 3(D). These inner case 5a, outer case 5b handle body 5 and the separate intermediate case member 4 form the handle-casing member in the claim of the invention.

As shown in FIG. 5(C), the sidewall 24 is formed with a groove 24b and a detent 24a. The width of the groove 24b is approximately the size of the diameter of the coil wire 3 and this groove 24b forms a part of a route for the coil wire 3 to form the bar antenna. When the coil wire 3 is not positioned in the groove 24b, then the groove 24b serves as a discharge (drain) passage for the water entered into the casing member (5a, 5b, 5c and 4). The outer inclined portion of the detent 24a functions to guide the bobbin 2 to the casing member when the contact portion 24c engages with or contacts with the casing member. The inner inclined portion of the detent 24a functions to guide the coil wire into the groove 24b when the coil wire passes through the groove 24b.

The bobbin 2 further includes a wire-fixing portion 22 (conductive material fixing portion) extending with an interval 28 from the sidewall 24. The expanded volume of the wire-fixing portion 22 is approximately the same as that of the sidewall 24. The wire-fixing portion 22 also includes a detent and a groove similar to the sidewall 24. The width of the groove is approximately the same size of the diameter of the coil wire 3. The interval 28 also is approximately the same as the diameter of the wire coil 3. Accordingly, the coil wire 3 can be held by the wire-fixing portion 22 at either one of the interval 28 or the groove of the wire-fixing portion 22.

The bobbin 2 includes a core holding portion 26 which sandwiches the core 1 inserted into the core-supporting portion 21 from both sides by utilizing the wire winding tension force. The core holding portion 26 has a thickness thinner than the sidewall 24 or the wire-fixing portion 22 so that the core holding portion 26 can sandwich the core 1 with enough tension force of the coil wire. In order to effectively utilize the tension force, the core holding portion 26 is provided with a guide projection 26a so that the coil wire is not overlapped or jammed and a fastening portion 26b which prevents the coil wire 3 from sliding towards the core 1 side at the boundary of the core holding portion 26 when the coil is wound around from the core holding portion to the core 1.

It is noted that the core holding portion 26a is positioned at the core central side relative to the wire-fixing portion 22 (at the right side in FIG. 5(A)) so that the coil wire 3 fixed by the wire fixing portion 22 is wound around the core holding portion 26a to fix the core 1 with the bobbin 2. Thereafter the coil wire 3 is wound around the central portion of the core 1. After the coil wire 3 has been wound around the central portion of the core 1, the coil wire 3 is wound around the core holding portion 26a to fix the core 1 with the bobbin 2. Thereafter, the wire-fixing portion 22 can fix the coil wire 3.

The bobbin 2 has the elastic portion 23 as mentioned above. The elastic portion is of plate spring structure and includes a tip end 23a which engages with the handle body 5 to which the bar antenna 10 is attached. By the contact or engagement between the elastic portion 23 and the handle body 5, the position of the bar antenna 10 can be defined.

A chamfer portion 25 is provided at the edge portion of the bottom of the bobbin 2. The chamfer portion 25 extends in a longitudinal direction of the core 1. This bottom portion contacts with the handle body 5 (casing member) to which the bar antenna 10 is attached.

The cross section of the chamfer portion 25 shows a right triangle. It is preferable that any one of the height of the triangle from the hypotenunuse as the bottom side, the length of the opposite side and the length of the adjacent sides is equal to or more than the diameter of the coil wire 3.

The space between the chamfer portion 25 and the casing member (handle body 5) can be used for guiding the coil wire 3 in the casing member if any one of the height of the triangle cross section of the chamfer portion 25 corresponds to any one of the height of the triangle from the oblique side as the bottom side, the length of the opposite side and the length of the adjacent sides is equal to or more than the diameter of the coil wire 3.

It is also preferable to discharge the water in the casing member using the gap between the handle body 5 (casing member) and the chamfer portion 25. The gap is connected to the gap between the core and the casing member and the water is discharged from the gap to the exterior of the handle.

Further, the bobbin 2 includes a holding portion 27 for holding the bar antenna 10 on a tool for winding the coil wire around the core 1. The detail of the tool will be explained later.

Figure 3C:
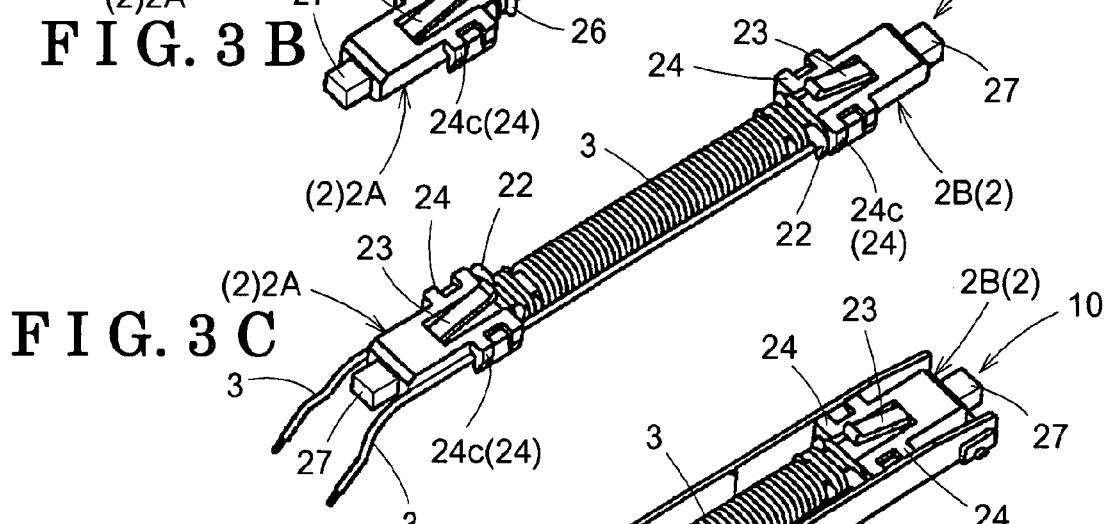
FIG. 3(C) is similar to FIG. 3(B), but showing the coil wire 3 being additionally assembled.

The process for assembling the bar antenna will be explained with reference to the attached drawings (FIG. 3 (A), FIG. 3(B) and FIG. 3(C)). First, the bobbins 2A and 2B are attached to each end of the ferromagnetic bar type core 1 having the rectangular in cross section. The core is inserted into each core-supporting portion 21 of the bobbins 2A and 2B for supporting the core. (FIG. 3(A) and FIG. 3(B)).

Figure 6:
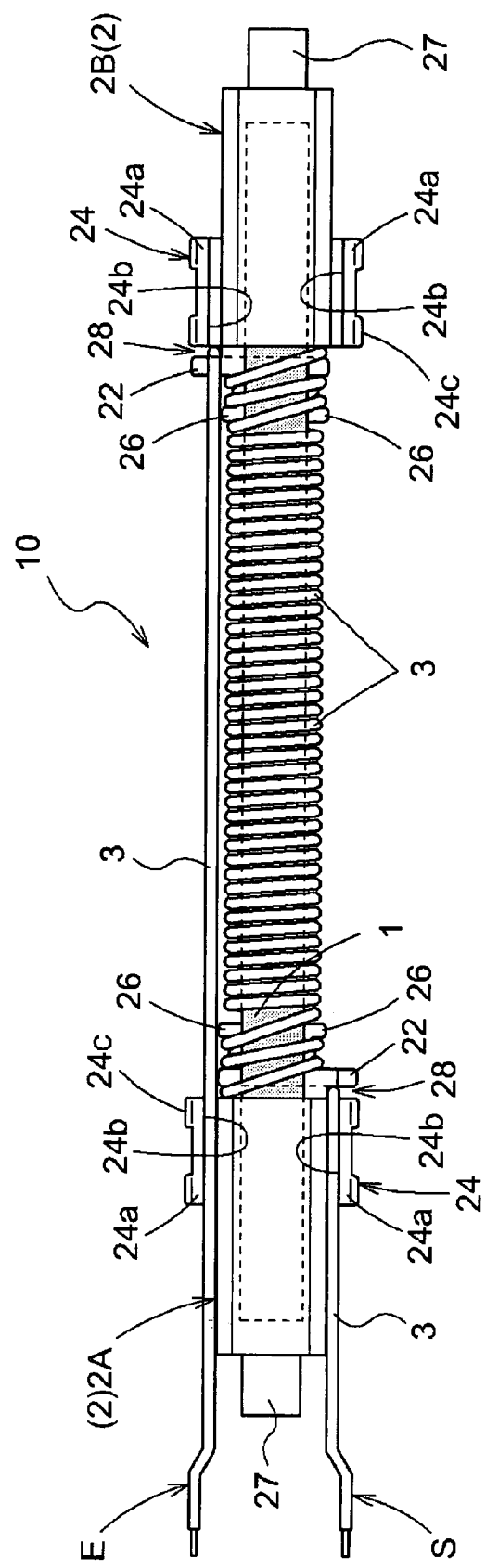
FIG. 6 is a bottom view of the bar antenna explaining the winding method of coil member.

Next, the coil wire 3 is wound around the core 1 by rotating the intermediate assembly (FIG. 3(B)) holding the antenna-supporting portion 27 of the bobbin 2 to the tool (not shown). FIG. 3(C) is a perspective view of the core 1 on which the coil wire 3 is wound. FIG. 6 shows a bottom view of the bar antenna 10 explaining the method of winding the coil wire on the core. Reference symbol S indicates a winding start portion (one end), reference symbol E indicates winding end portion (the other end) of the coil wire 3.

The coil wire 3 is first sandwiched between the bobbin sidewall 24 and the wire-fixing portion 22 and fixed to the gap 28 therebetween. Then the coil wire 3 is wound twice (two rounds) at the core holding portion 26.

The core 1 is securely held on the bobbin 2A through the core holding portion 26 by the tension force of the coil wire. Then the coli wire 3 is further wound around the core 1 with a predetermined number of round to reach to the other bobbin 2B. The coil wire 3 is wound around the core 1 for two rounds at the core holding portion 26. The coil wire 3 is fixed at the gap 28 between the sidewall 24 and the wire-fixing portion 22. The winding end portion E is guided to the winding start side.

Figure 3D:
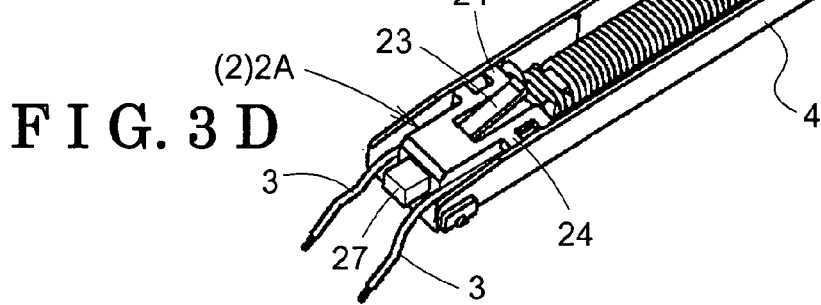
FIG. 3(D) is similar to FIG. 3(C), but showing the intermediate case being assembled.
Figure 4:
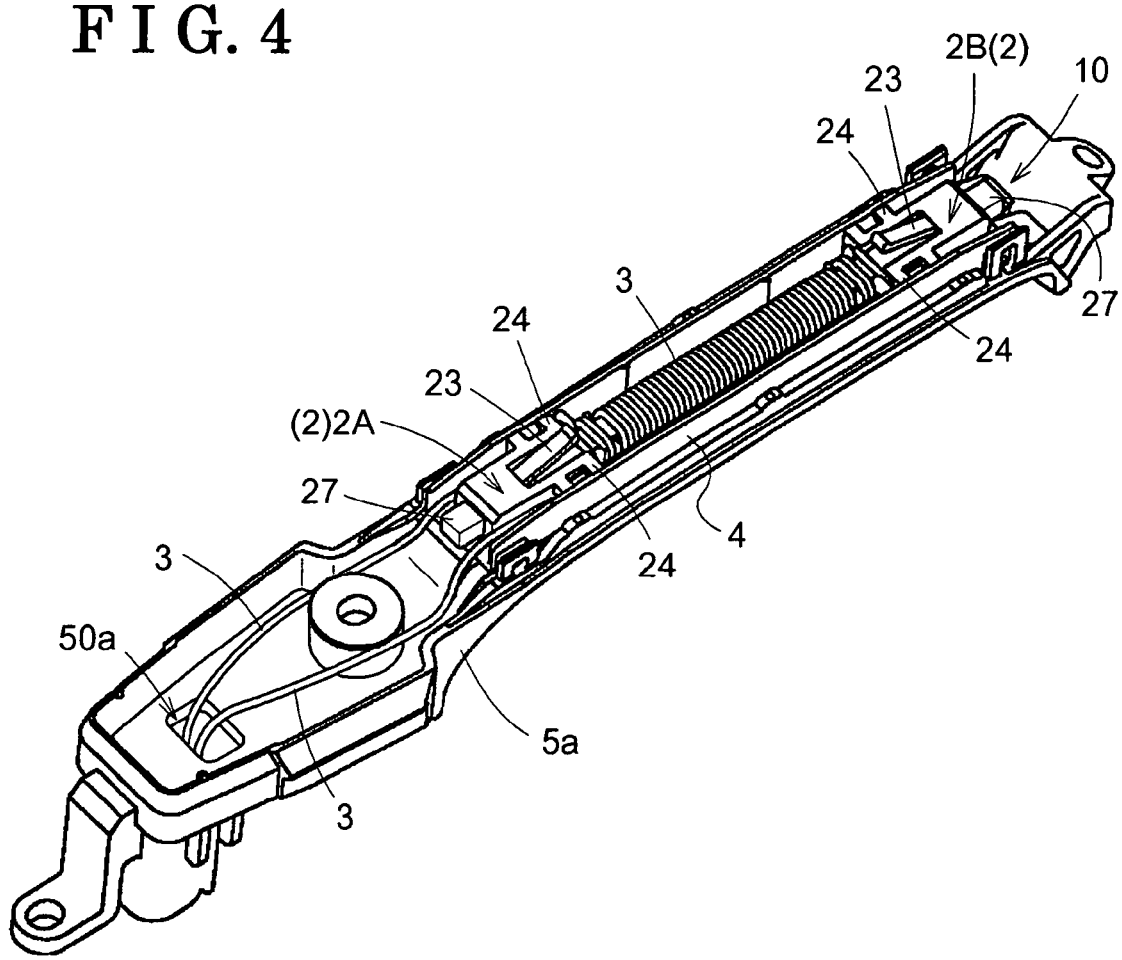
FIG. 4 is a perspective view of the door handle with the bar antenna housed inside the door handle.

The bar antenna 10 on which the coil wire 3 is wound is attached to the intermediate member 4 (FIG. 3(D)). As shown in FIG. 4, the bar antenna 10 is attached to the inner case 5a of the handle 50 together with the intermediate member 4. The tip end S and the rear end E of the coil wire 3 are guided into the inner side of the door handle 60 through an opening 50a provided on the inner case 5a. Thus the coil wire forming the bar antenna 10 is formed by the insulated covered harness in the inner space of the handle 50. The bar antenna 10 does not have any electrical contacts and accordingly, the water invasion problem that the water enters into the inner space of the door handle may less influence on the bar antenna The durability is improved far better than the bar antenna with the electric contact.

As indicated above, the electrode plate 6 for the electric capacitance sensor is housed in the inner case 5a of the door handle 50 between the inner case 5a and the bar antenna 10. When the inner case 5a engages with the outer case 5b, the elastic portion 23 of the bar antenna 10 contacts with the outer case 5b in the inner space of the door handle body 5. BY the biasing force of the elastic portion 23 of the bar antenna 10, the bar antenna 10, intermediate member 4 and the electrode plate 6 of the electric capacitance sensor are pressed towards the inner case 5a for securing the bar antenna to the case member.

The case member includes a separate intermediate case member 4, but it may be directly attached to the door handle 50 or the casing to which the bar antenna is attached.

According to the embodiment illustrated above, the bar antenna is attached to the door handle 50, but it may be provided at the door mirror or room mirror. The bar antenna is utilized as the outside sending antenna, but it may be used as a receiving antenna or sending/receiving antenna.

According to the structure above, the core inserted into the core-supporting portion is firmly held by the core holding portion, which is elastically deformed upon the conductive wire material being wound around the core with a tension force. Thus the core and the bobbin for bar antenna (or simply "bobbin") are fixed without using any bonding agent. The conductive wire material can be fixed to the bobbin by winding the conductive wire material around the conductive wire material fixing portion. Thus the core and the conductive wire material are fixed in stable condition through the bobbin.

As the result, a bar antenna with a simple structure formed by a core, a conductive wire and a bobbin can be stably fixed only utilizing a tension force of the conductive wire material, without using any sealant such as potting agent or without any heat deforming processing.

In other words, according to this structure, a bobbin for bar antenna can be assembled simply and with less number of processing.

Further, according to the invention, the bobbin for the bar antenna includes an elastic portion for positioning the bar antenna by being in contact with a casing member of the door handle in which the bar antenna is attached.

According to this structure, the position of the bar antenna can be defined by the elastic portion being in contact with the casing member and no extra positioning device is needed.

According to another aspect of the invention, the bobbin for the bar antenna includes an antenna supporting portion for supporting the conductive wire material on a tool for winding the conductive wire material on the core.

According to the structure above, the conductive wire material can be easily wound on the core without using any auxiliary device, just using the elements composing the antenna.

According to further aspect of the invention, the bobbin for the bar antenna is provided at both ends of the core.

According to still further aspect of the invention, the bobbin for the bar antenna includes a chamfer portion provided at a bottom edge of the bobbin in longitudinal direction of the core and positioned opposite to the elastic portion.

It is preferable to discharge any water in the casing member quickly as possible. The size of the bobbin is larger than that of the outer diameter of the core because the bobbin receives therein the core for holding. Therefore, the chamfer portion can be provided at the bottom edge of the bobbin in longitudinal direction of the core. This structure enables to establish communication between the core peripheral portion and the bottom edge of the bobbin. This communication makes a passage for flowing out the water in the casing member of the door handle. Thus according to this structure the water entered in the casing member of the door handle can be discharged to improve the durability of the antenna in the casing member.

According to the invention, the bobbin for the bar antenna includes a sidewall extending both sides in shorter dimension of the core. The positioning of the bar antenna relative to the casing member is defined by the contact of the bar antenna with the sidewall. Thus the fixing of the bar antenna to the casing can be achieved according to the positioning above.

Further, the sidewall of the bobbin includes a groove and a detent. The groove is used as a discharge passage for the water entered in the casing member and the detent is used for properly guiding the bobbin to the casing member and guiding the wire to the groove. The assembling of the bobbin to the casing member can be easily made by the deformation of the detent and the winding of the wire with the groove is also easily made.

According to the invention, the bobbin includes a wire fixing portion extending similarly to the sidewall with a predetermined interval with the sidewall. Thus the coil wire can be fixed using at least one of the interval and the groove.

According to the invention, the bobbin further includes a guide projection and a fastening portion at the core holding portion.

By using such guide projection and the fastening portion, the coil wire can be smoothly wound on the core by the assisting of the guide projection to provide a proper tension for holding without any overlapping problem or sliding of the core wire towards the core side during the winding operation.

Thus the core wire can be wound around the predetermined position of the core holding portion.

According to the present invention, the door handle for a vehicle is installed on the door for operation of the vehicle user to open or close the door. The door handle also detects such user's operation to the door handle based on the establishment of communication between the user's carrying device and the antenna device in the door handle. The door handle includes a bobbin for a bar antenna at the both ends of the core and the bar antenna position of which is defined at the casing of the door handle by the elastic portion and the bar antenna communicates with the user's carrying communication device.

Further, the door handle includes a sensor electrode plate housed in the door handle casing opposite to the bar antenna as well as a door panel for a sensor for detecting user's operation to the door handle.

According to the invention, the bar antenna with a bobbin is positioned at the casing member in the door handle by the elasticity of the elastic portion of the bobbin. Further, the sensor electrode plate is secured inside the door handle by the urging force of the elastic portion of the bobbin. These structure enable for fittingly and accurately accommodating the bar antenna and the sensor electrode plate. Thus the door handle according to the invention improves durability and has a simple structure without any extra fixing member, adhesion agent or any sealant.

The principles, preferred embodiment and mode of operation of the present invention have been described in the foregoing specification. However, the invention, which is intended to be protected, is not to be construed as limited to the embodiment disclosed. Further, the embodiments described herein are to be regarded as illustrative rather than restrictive. Others may make variations and changes, and equivalents employed, without departing from the spirit of the present invention. Accordingly, it is expressly intended that all such variations, changes and equivalents that fall within the spirit and scope of the present invention as defined in the claims, be embraced thereby.

What we claim is:

1. A bobbin for a bar antenna comprising a core supporting portion into which a bar shaped ferromagnetic core is inserted and supported, the core supporting portion being attached to at least one end of the bar antenna formed by the bar shaped ferromagnetic core around which a conductive wire material is wound, a conductive wire material fixing portion for fixing the conductive wire material and a core holding portion for sandwiching the bar shaped ferromagnetic core inserted into the core supporting portion from opposing both sides and firmly pressing by a tension force of the conductive wire material wound thereon.

2. The bobbin for a bar antenna according to claim 1, wherein the bar antenna includes an elastic portion contacting with a casing member of a door handle to which the bar antenna is attached for defining a position of the bar antenna relative to the casing member.

3. The bobbin for a bar antenna according to claim 2, further comprising an antenna supporting portion for supporting the bar antenna to a tool for winding the conductive wire material on the ferromagnetic core.

4. The bar antenna according to claim 2, wherein the bobbin for the bar antenna is provided at both ends of the ferromagnetic core.

5. The bobbin for the bar antenna according to claim 2, wherein a chamfer portion is provided at a bottom edge of the bobbin in a longitudinal direction of the ferromagnetic core and positioned at the opposite end of the elastic portion which contacts with the casing member to which the bar antenna is attached.

6. The bobbin for a bar antenna according to claim 1, further comprising an antenna supporting portion for supporting the bar antenna to a tool for winding the conductive wire material on the ferromagnetic core.

7. The bar antenna according to claim 6, wherein the bobbin for the bar antenna is provided at both ends of the ferromagnetic core.

8. The bar antenna according to claim 1, wherein the bobbin for the bar antenna is provided at both ends of the ferromagnetic core.

9. The bobbin for the bar antenna according to claim 1, wherein a sidewall is provided at the both ends in shorter direction of the core.

10. The bobbin for the bar antenna according to claim 9, wherein the sidewall includes a groove and a detent portion.

11. The bobbin for the bar antenna according to claim 9, further including a plurality of wire fixing portions having an extended portions provided with a predetermined interval with the sidewall.

12. The bobbin for the bar antenna according to claim 1, wherein the core holding portion includes a guide projection and a detent portion.

13. A door handle device provided on a vehicle door and operated upon door closing and opening operations by a user of the vehicle, the handle further including a communication function for communication with a remote control device carried by the user of the vehicle and detecting a user's operation of the door handle device, the door handle device comprising a bar antenna positioned to a casing of the door handle device by an elastic portion and communicating with the remote control device carried by the user of the vehicle and an electrode plate housed in the door handle device opposite to the bar antenna and opposite to a door panel for detecting the user's operation of the door handle device, the bar antenna comprising a bobbin comprised of a core supporting portion into which a bar shaped ferromagnetic core is inserted and supported, the core supporting portion being attached to at least one end of the bar antenna formed by the bar shaped ferromagnetic core around which a conductive wire material is wound, a conductive wire material fixing portion for fixing the conductive wire material and a core holding portion for sandwiching the bar shaped ferromagnetic core inserted into the core supporting portion from both opposing sides and firmly pressing by a tension force of the conductive wire material wound on the ferromagnetic core.

14. The door handle device according to claim 13, wherein the bobbin is a first bobbin provided at one end of the ferromagnetic core, and further comprising a second bobbin at an opposite end of the ferromagnetic core.

15. The bobbin for the bar antenna according to claim 13, wherein a chamfer portion is provided at a bottom edge of the bobbin in a longitudinal direction of the ferromagnetic core and positioned at an opposite end of the elastic portion which contacts the casing member to which the bar antenna is attached.

* * * * *